United States Patent [19]

Umholtz

[11] Patent Number: 4,873,922

[45] Date of Patent: Oct. 17, 1989

[54] COMBINED EGG POACHER AND SERVING PLATE

[76] Inventor: Franklyn G. Umholtz, 644 Riverview Rd., Flagler Beach, Fla. 32036

[21] Appl. No.: 241,065

[22] Filed: Sep. 6, 1988

[51] Int. Cl.$^4$ .............................................. A47J 43/18
[52] U.S. Cl. ...................................... 99/426; 99/430; 99/449
[58] Field of Search ................. 99/426, 427, 430, 428, 99/449, 418

[56] References Cited

U.S. PATENT DOCUMENTS

| 323,887 | 8/1885 | Rutter | 99/426 X |
| 869,690 | 10/1907 | Brown | 99/426 X |
| 2,454,054 | 11/1948 | Gibb | 99/449 |
| 2,666,551 | 1/1954 | Wyman | 99/440 |
| 2,761,375 | 9/1956 | Jepson | 99/440 |
| 2,824,510 | 2/1958 | Gangwer | 99/426 X |
| 3,020,824 | 2/1962 | Pantermoller | 99/346 |
| 3,831,508 | 8/1974 | Wallard | 99/440 |
| 4,280,032 | 7/1981 | Levinson | 99/440 |
| 4,345,516 | 8/1982 | Sinclair | 99/430 X |
| 4,413,167 | 11/1983 | Martel et al. | 99/DIG. 14 X |
| 4,617,860 | 10/1986 | Blaylock | 99/426 |
| 4,681,027 | 7/1987 | Meamber | 99/426 X |

FOREIGN PATENT DOCUMENTS

| 654560 | 12/1962 | Canada | 99/430 |
| 979330 | 12/1950 | France | 99/427 |
| 5523 | 3/1896 | United Kingdom | 99/426 |

Primary Examiner—Stephen Marcus
Assistant Examiner—Christine A. Peterson

[57] ABSTRACT

A device for poaching and serving eggs, whereby the egg is kept compact and picture perfect by minimizing the spreading of the egg white while the raw egg is being totally immersed in a poaching liquid 60. Said liquid usually means water, however, a variety of poaching liquids may be used to impart various flavors at a minimum of cost. The egg poaching device FIG. 1 comprises a body member 20 to partially contain the egg. This body member 20 handle 32 for easy removal from the serving plate 36. Said plate 36 is used to partially contain the egg also has a handle 52, attached, to facilitate easy serving of the egg FIG. 9.

5 Claims, 4 Drawing Sheets

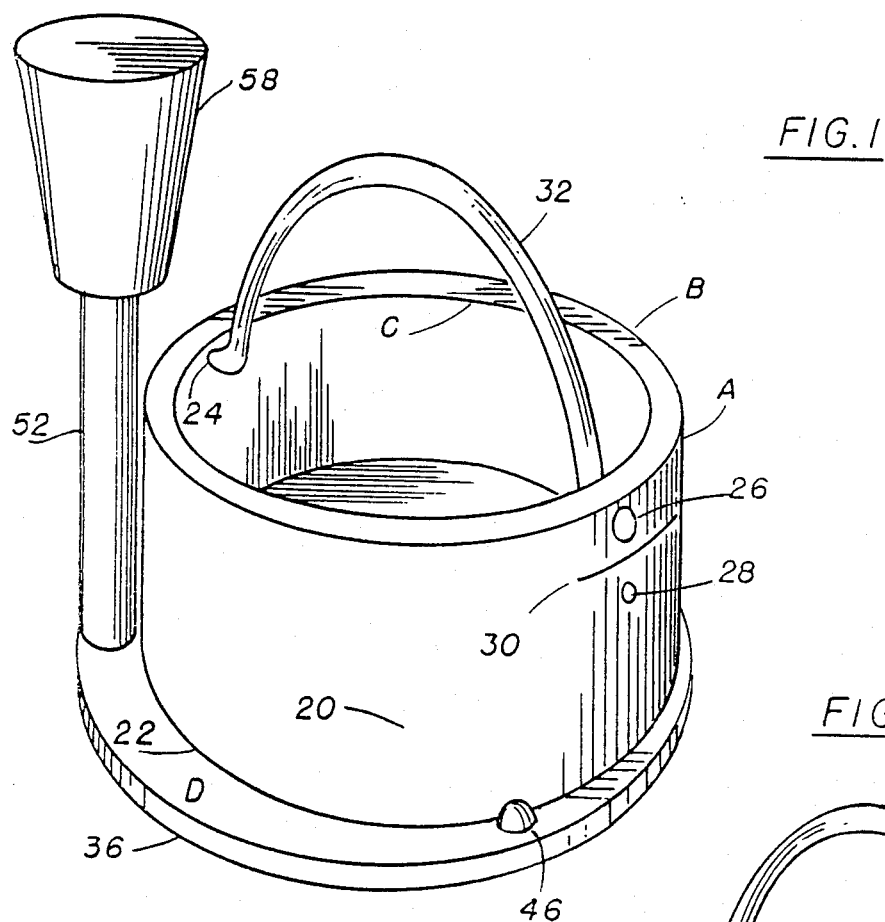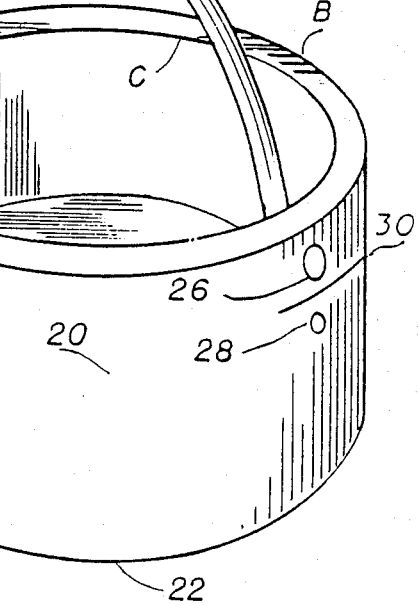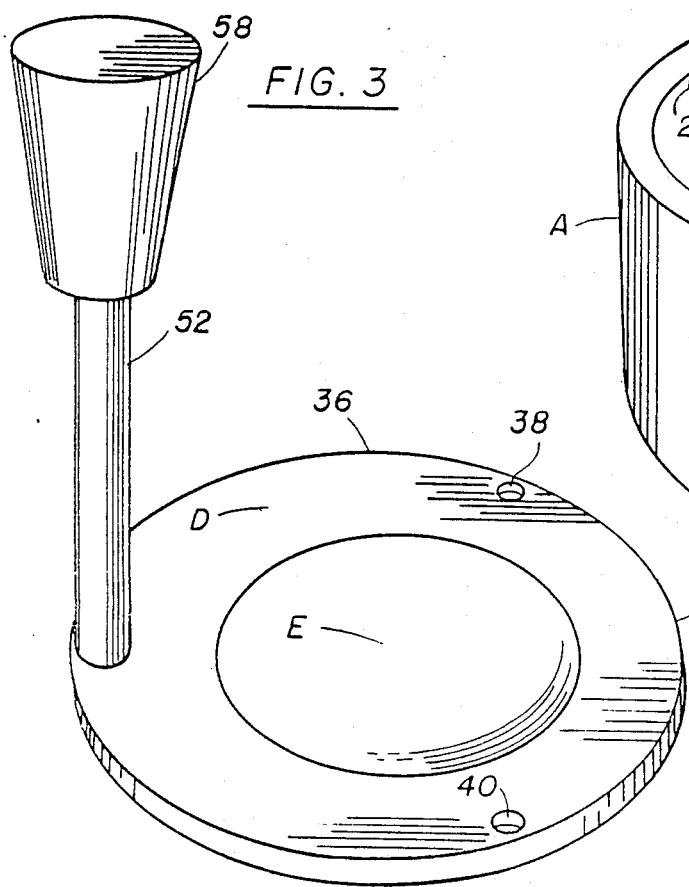

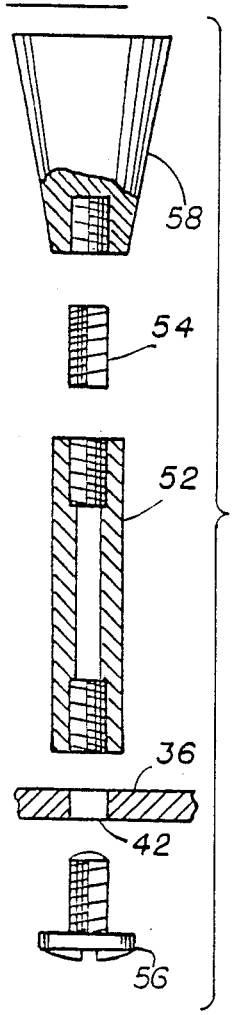
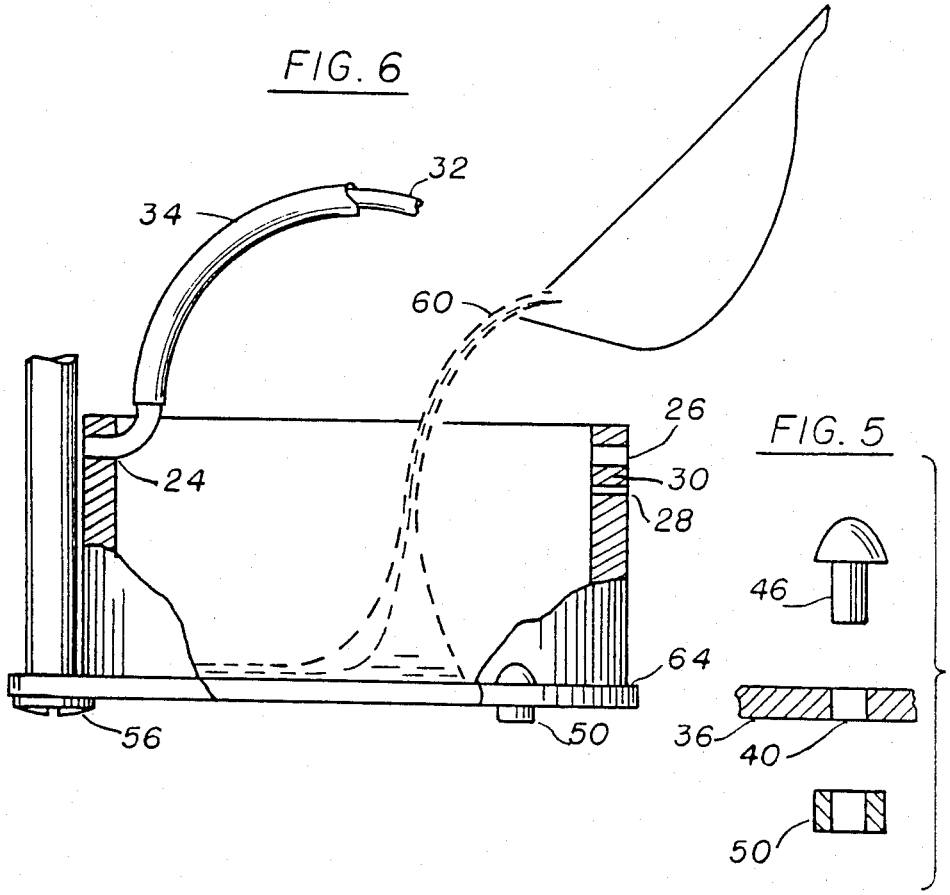
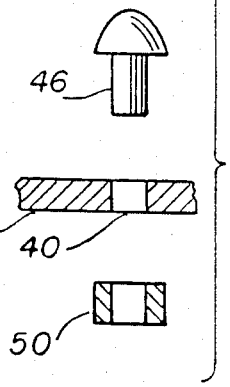
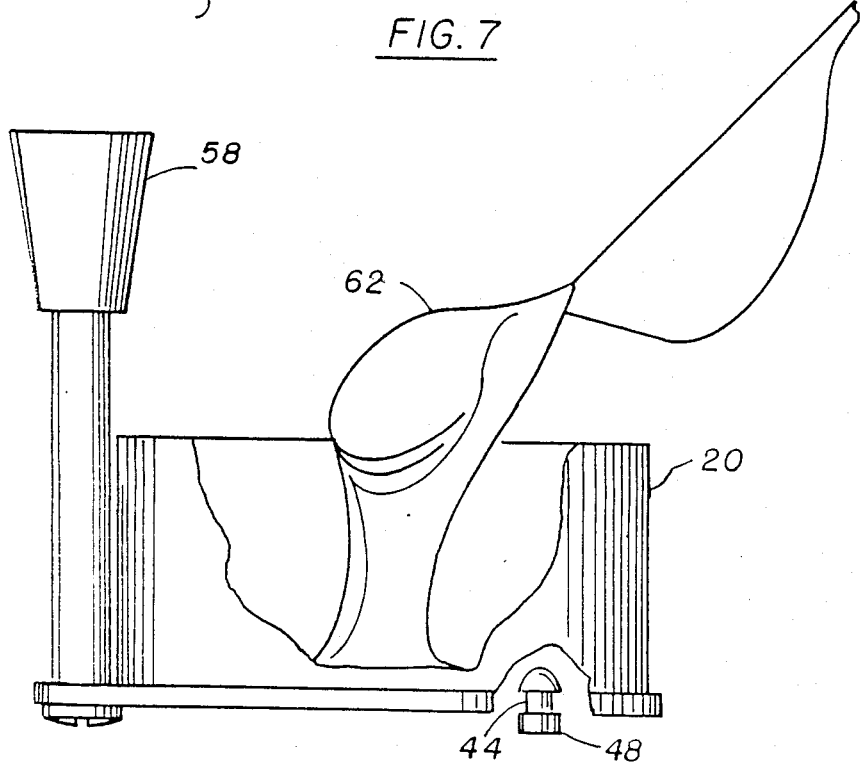

COMBINED EGG POACHER AND SERVING PLATE

BACKGROUND

1. Field of Invention

This invention relates to a device for poaching and serving eggs that have been removed raw, with the yolk unbroken from their shells so that in the placing of the uncooked egg in said device, the egg can be placed whole into said device for poaching thereof, in which said device is particulary adapted on minimizing the spreading of the uncooked egg white as liquid slowly flows into said device, when said device is placed into a pan and a simmering liquid is added to said pan thereby keeping the egg compact during the poaching thereof and to further facilitate easy serving of the egg or eggs.

2. Description of Prior Art

In poaching eggs, it is desirable to minimize the spreading of egg white thereof and keep the egg compact. No special equipment is required for poaching, other than a skillet or pan containing a simmering liqiud, which is usually water. The difficulty arises in the careful skill required in sliding the raw egg into the liquid thereof, and still keeping the egg compact. Eggs not placed skillfully into the poaching liquid will have a straggley outline thereof and require trimming for an eye appeal presentation. This problem is further compounded and made more difficult if the egg is more than one week old. Because of this problem, many cooks, skilled in the art of poaching, stir the poaching liquid to create a whirlpool before sliding the egg into the pan, this said whirlpool helps to keep the egg compact, however by using this method, only one egg can be poached at a time. Still another method is to carefully fold the white over the yolk as soon as the egg is placed in the simmering liquid. Heretofore it is apparent that the poaching of eggs requires the carefull skill of the cook.

Many so-called poaching pans that are available with built in small cups and supported above the simmering liquid to contain the eggs, do not actually poach. The eggs are cooked by steaming rather than immersion. Therefore the eggs lack the true flavor or a poached egg. Also it has been found that serving the steamed egg from the cup can be very difficult.

Another type of poacher consisted of a shallow ring constructed of thin flat metal with an attached linear handle perpendicular to the horizontal of the ring. Users placed the ring in a pan containing simmering water and they would slide the egg into said ring for poaching. This type of poacher is unsatisfactory because the white of the egg easily slides out from under the bottom of the thin edge of the ring, into the pan. Also, with this type of ring, the egg is being partially poached from the bottom and steamed from the top. Therefore, this device is better suited for use in frying eggs rather than poaching them. Furthermore, because the egg is in direct contact with the surface of the pan, the bottom of the egg develops a rubbery texture, therefore imparting an unsatisfactory taste.

Still another type of poacher consisted of an oblong shallow cup like shape of thin perforated metal, and having four legs protruding from the bottom thereof with an attached linear handle vertical to the horizontal portion of the cup. Users placed the cup in a pan of simmering liquid thereof and then an egg was placed into the cup for poaching. This type of device is unsatisfactory because the white of the egg easily slides through the perforated cup and becomes attached to the holes during poaching, therefore making it very difficult to serve the egg without breaking the soft yolk. This type of poacher is further unsatisfactory because by total immersion, the white of the egg will spread over the top of the poacher creating a straggley outline, therefore requiring trimming in order to create an eye appealing presentation.

Most users, therefore, would find it desirable to have a device that easily poaches through total immersion, keeping the egg compact, and also facilitates an easy method for serving the egg after poaching.

OBJECTS AND ADVANTAGES

Accordingly I claim the following as my objects and advantages of the invention: to provide a device for easy reliable and neatly poaching of eggs, to provide such a device that keeps the egg compact and picture perfect for an eye-appeal presentation, to provide such a device that eliminates the spreading of the white of the egg, to provide such a device that eliminates the trimming of the straggley outline of the egg white, to provide such a device for poaching by total immersion of the egg, to provide a device that facilitates easy serving of the egg after poaching, to provide such a device which requires a minimum of skill and training to use, and to provide such a device which can do a complete job of poaching eggs.

Readers will find further objects and advantages of the invention from a consideration of the ensuing description and the accompanying drawings.

DRAWING FIGURES

FIG. 1 shows a vertical pespective view of my novel egg poaching device according to the invention.

FIG. 2 shows a vertical perspective view of the body member.

FIG. 3 shows a partial perspective view of the serving tray.

FIG. 4 shows an exploded vertical assembly view of the serving plate handle.

FIG. 5 shows an exploded vertical assembly view of one of the serving plate legs.

FIG. 6 shows a vertical cross section of the device with a poaching liquid being added.

FIG. 7 shows a vertical cross section of the device with a raw egg being added.

Figure 8:
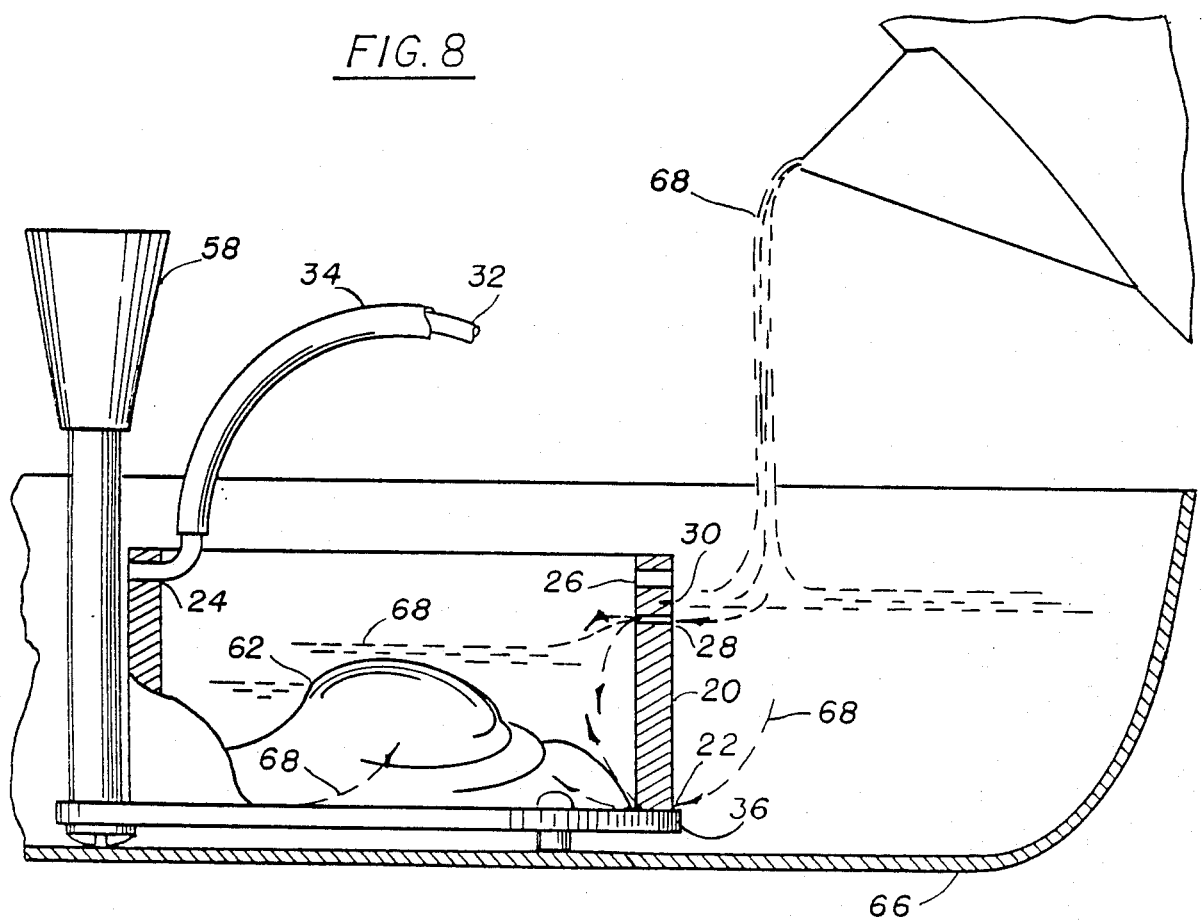
FIG. 8 shows a vertical cross section showing the method of poaching an egg.

DRAWING REFERENCE NUMERALS 20 body member
22 body undersurface
24 handle hole
26 handle hole
28 orifice
30 level line
32 body handle
34 plastic cover
36 serving plate
38 leg hole 40 leg hole
42 handle hole
44 rivet 44 protrusion
46 rivet 46 protrusion
48 leg
50 leg
52 serving plate handle
54 threaded insert
56 threaded fastener
58 threaded knob
60 tablespoon of poaching liquid
62 raw egg
64 semi-tight liquid seal
68 simmering water
70 poached egg

DRAWING REFERENCE LETTERS

A Body Height
B Outside Diameter
C Inside Diameter
D Flat Surface
E Spherical Center
F Outer Perimeter Egg Poaching Device—Description FIG. 1 shows an egg poaching device according to the preferred embodiment of the invention. The device comprises a cylindrical body member 20 which is about 1.67 inches in height A and has an approximate outside diameter B of 3.5 inches with an inside diameter C of about 3 inches, seen in FIG. 2, and which is preferably made of aluminum.

Body member 20 FIG. 2 has a smooth flat under surface 22 so that it may rest squarely on a smooth flat plate 36 FIG. 3 thereby forming a semi-tight liquid seal between the said body member 20 and the said flat plate 36. Round holes 24 and 25 with diameters of about 0.12 inches located in the upper portion of said body member. Said holes providing a means of attaching a handle 32, best seen in FIG. 6. Located on the upper two thirds of the said cylinder is a small orifice 28 having a diameter of about 0.0625 inches to partially function in controlling the amount of flow of simmering water 68 entering said egg poaching device, FIG. 1 (shown clearly in the sectional view of FIG. 8) when said egg poaching device of FIG. 1 is placed in a pan 66 and said simmering water 68 is added.

The handle 32 attached to the body member 20 which is preferably made of aluminum rod and is about 0.125 inches in diameter and has a basic semi-circular shape with ends bent at a right angle, FIG. 6 providing a means whereby the handle 32 may engage holes 24 and 26 of said body 20. The handle 32 is covered with a shrink type plastic 34, FIG. 6, thereby providing means in preventing heat transfer from said aluminum rod 32 to the user.

FIG. 3 shows the serving plate 36 which is about 4. inches in diameter and approximately 0.12 inches thick which is preferably made of aluminum and has a smooth precision flat upper surface D. The said serving plate 36 also has a shallow concave spherical center area E which is approximately 1.75 inches in diameter. This said area E provides a method of centering the yolk of the raw egg 62 on the said serving plate 36 FIG. 7. The serving plate 36 has two holes, 38 and 40 located close to the outer perimeter F providing a means for securing protrustions 44 and 46, and legs 48 and 50, best seen in the vertical assembly view FIG. 5. The said protrustions 44 and 46 FIG. 9. provide a means for positioning the body member 20 on said serving plate 36. The said legs 48 and 50, along with threaded fastener 56, FIG. 4, provide a method of elevating said serving plate 36 above the upper surface of a pan 66, seen in FIG. 8. This said elevating performs the function of eliminating boiling inside the egg poaching device F 1, (shown clearly in the vertical section view of FIG. 8) when the simmering water in the pan accidently becomes too hot.

The serving plate handle 52, of FIG. 3, is made from thick wall tubing which is about 2.5 inches long, with an outside diameter of about 0.44 inches, and is preferably made of aluminum. The handle 52 is threaded on both ends, clearly seen in the vertical assembly FIG. 4. Said handle 52 is secured through hole 42 in the serving plate 36 with threaded fastener 56, said handle 52 provides a means for attaching the heat resistant knob 58, FIG. 4, with threaded insert 54 to said handle 52.

Usually water is chosen for poaching, however other liquids may be used to impart various flavors at a minimum of cost. Liquids such as orange juice, wine, milk, soy sauce, etc., may be used for this function. Users will find that the serving plate 36, FIG. 9, facilitates easy serving of a poached egg 70.

Figure 9:
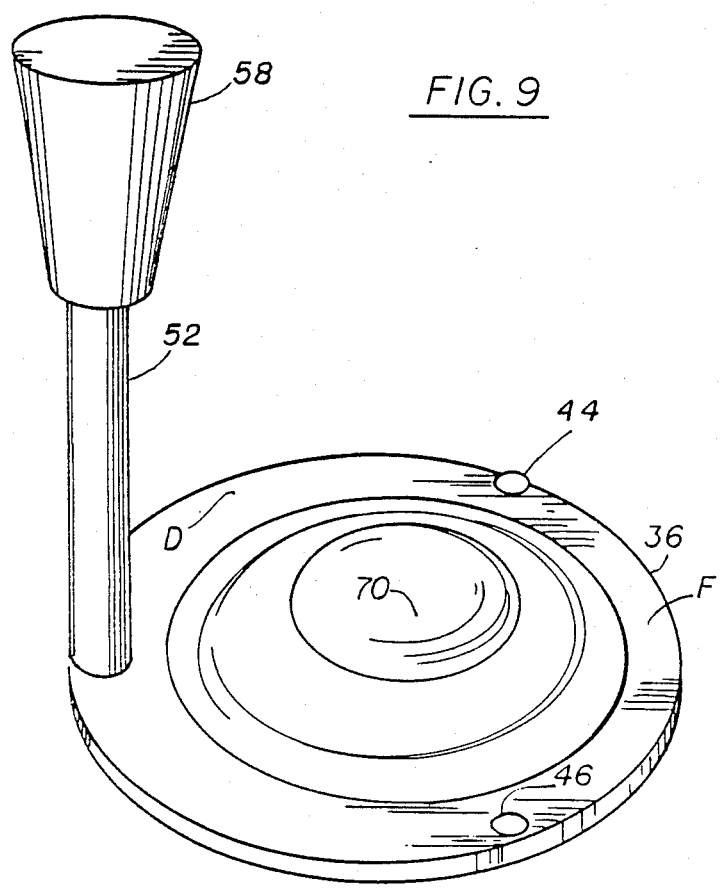
FIG. 9 shows a vertical perspective view of the serving plate with a poached egg.

To poach an egg, the user should place the body member 20, FIG. 2, squarely on the serving plate 36, FIG. 1. Allignment between said body 20 and said serving plate 36 will be automatic, due to the protrusion of rivets 44 and 46 FIGS. 1 and 9, and serving plate handle 52. The user should pour a tablespoon of the desired poaching liquid 60, FIG. 6 which should be at room temperature into the body member 20. The user then should gently place a fresh raw egg, with the unbroken yolk 62, FIG. 7 into the body member 20. Next, as shown in FIG. 8 the egg poaching device of FIG. 1 is placed in a pan 66 and simmering water 68 is then poured into said pan 66 FIG. 8, to the water level line 30 on the body member 20. As the water is poured into pan 66 FIG. 8, heat is quickly transferred to the egg poaching device, FIG. 1, thereby expanding the semi-tight liquid seal 64, between the body member 20 and the serving plate 36, FIG. 8. Expansion takes place as the simmering water 68 in the open pan 66 slowly enters the body member 20 and blends with the poaching liquid 60, FIG. 6. At about the same time, said simmering water 68 slowly flows through an orifice 28 into the body member 20 This said slow flow reduces the turbulence of the said blending of water 68 with the poaching liquid 60 and raw egg 62, thereby keeping the egg compact while total immersion is taking place, and said raw egg 62 is being poached. The user should then remove the body member 20 about 7 minutes after the raw egg has turned an opaque white color by lifting the body member 20 with handle 32, and setting it aside FIG. 2. Next, the user will decide on the amount of poaching desired, and then remove the serving tray 36 with the egg 70 for serving FIG. 9.

While I have described the process of poaching and serving an egg or eggs with a device of the invention in some detail, in practice, I have found that it can be performed very neatly and rapidly, usually in less than seven minutes.

Figure 10:
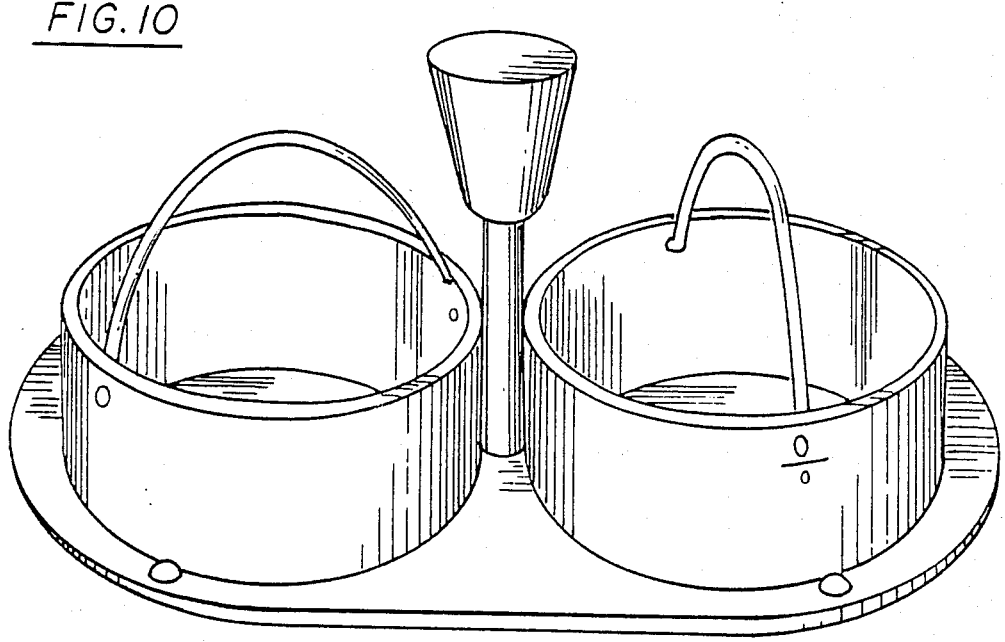
FIG. 10 shows a vertical perspective view with two body members.
Figure 11:
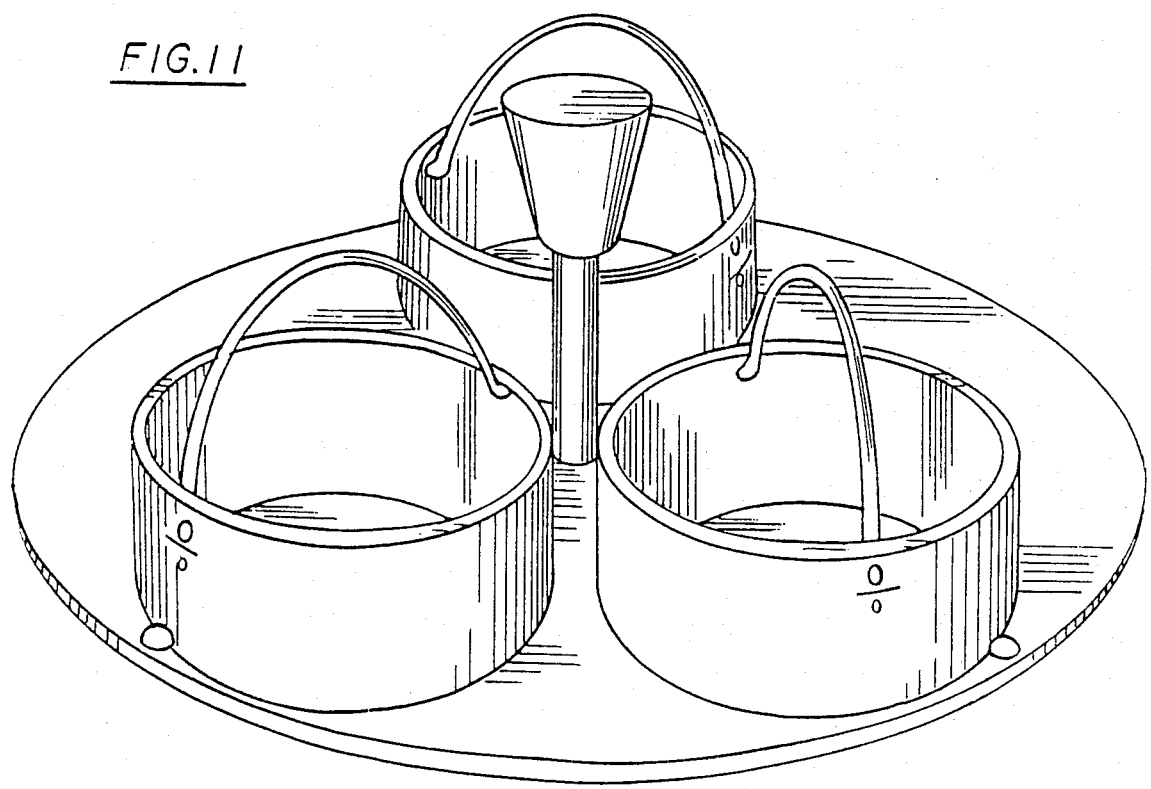
FIG. 11 shows a vertical perspective view with three body members.

Although my invention is fully capable of achieving the results and providing the advantages hereinbefore mentioned, it is to be understood that it is merely the presently preferred embodiment thereof. Those skilled in the art, will envision many other possible variations, are within its scope. For example skilled artisans. will readily be able to change the dimensions, shape, and location of the various embodiments, FIGS. 10 and 11. They will also be able to make the device of alternative materials, such as plastics, glass, ceramics, and alloys. They even can make many variations on the semi-tight liquid seal which partially controls fluid flow 64 FIG. 6. They also can make the serving plate without the shallow spherical center E FIG. 3. They further can make the orifice 28 FIG. 1 larger or smaller or include more than one orifice. They can secure the handle 52 FIG. 4 to the serving plate 36 FIG. 2 by several methods of fastening such as staking, welding, riveting, threading, bolting, pressing, glueing, pinning, upsetting, crimping, swaging, sweating, or soldering. They can further form the handle as an integral part of the serving plate, such as in molding, casting, folding, or drawing. They also can change the physical design of the handle or its functional location FIGS. 10 and 11. They even can provide a handle that clamps, slides, pivots, or locks on to the serving plate, or a handle that can be easily removed, thus creating two or more distinct components. They also can provide an alternate protrusion method 44, 46 FIGS. 1, 5, 9 such as a rim, or the use of pins. In fact the protrustions can be removed and replaced with a groove in the serving plate for the alignment of the body member. Further the protrusions can be located on the body member whereby the method of alignment is reversed between the body member and serving plate. Accordingly the reader is requested to determine the scope of the invention, and I do not mean to be limited to the details of construction above described other than as defined in the appended claims and not by the examples which have been given.

I claim:

1. A poaching device comprising a body member defining a poaching chamber and having a smooth undersurface, and a plate member having a smooth upper surface complementing said body member undersurface for supporting said body member and forming a semi-tight seal between said body and plate members, a small flow-controlling orifice extending from the outside and communicating with said chamber spaced from said undersurface wherein said orifice has a diameter of about 0.0625 inch.

2. A device in accordance with claim 1 wherein the upper surface of said plate member has at least one upwardly extending protrusion of such size as not to interfere with free flow of fluid thereabout for aligning said body member with said plate member.

3. A device in accordance with claim 1 wherein the underside of said plate member includes a plurality of protrusions to support said plate member on the upper surface of pan containing a simmering fluid and spaced therefrom.

4. A device in accordance with claim 1 including a serving plate handle secured to said plate member between said smooth surface portion and the periphery thereof and extending upwardly therefrom to above said body member when supported on said plate member and having a heat insulating knob at the end thereof to permit ready removal of said device from the simmering fluid and permit manipulation of said plate member with the poached article thereon after removal of said body member.

5. A device in accordance with claim 1 adapted to poach a shelled raw egg wherein said plate member upper surface having a shallow concave depression to locate the yolk of the egg to be poached.

* * * * *